United States Patent [19]
Brown et al.

[11] Patent Number: 5,032,924
[45] Date of Patent: Jul. 16, 1991

[54] SYSTEM FOR PRODUCING AN IMAGE FROM A SEQUENCE OF PIXELS

[75] Inventors: Wendell D. Brown, Cupertino; William T. Glaser, San Jose, both of Calif.

[73] Assignee: Nilford Laboratories, Inc., Palo Alto, Calif.

[21] Appl. No.: 335,640

[22] Filed: Apr. 10, 1989

[51] Int. Cl.⁵ .............................................. H04N 5/74
[52] U.S. Cl. .................................... 358/231; 358/208
[58] Field of Search ................. 358/231, 60, 206, 208

[56] References Cited

U.S. PATENT DOCUMENTS

| | | | |
|---|---|---|---|
| 3,011,124 | 11/1961 | Hermann | 358/208 |
| 3,614,312 | 10/1971 | Fournier | 358/208 |
| 4,032,888 | 6/1977 | Broyles | 358/208 |
| 4,213,148 | 7/1980 | Maiman | 358/232 |
| 4,358,789 | 11/1982 | Confer | 358/208 |
| 4,562,349 | 12/1985 | Stumm | 358/208 |
| 4,797,749 | 1/1989 | Paulsen | 358/208 |
| 4,818,861 | 4/1989 | Horiuchi | 358/235 |

FOREIGN PATENT DOCUMENTS

| | | |
|---|---|---|
| 0301801 | 7/1988 | European Pat. Off. . |
| 95472 | 7/1980 | Japan .................................. 358/140 |

OTHER PUBLICATIONS

"The Fischer Large Screen Projection System (Eidophor)," E. Baumann, 20 J.SMPE 351 (1953).
W. Turner and R. Sprague, "Integrated Total Internal Reflection (TIR) Spatial Light Modulator for Laser Printing," 299 *Proc. SPIE* 76 (1981).
R. Sprague et al., "Linear Total Internal Reflection Spatial Light Modulator for Laser Printing," 299 Proc. SPIE 68 (1981).
Murano et al., "A Video Projector Using a PLZT Light Shutter Array," Japanese Journal of Applied Physics, 24 (1985) Supplement 24-2, pp. 139-143.
Ohmura et al., "A New Type of PLZT Light Valve for an Image Projection," 1988 *International Display Research Conference*.

*Primary Examiner*—Tommy P. Chin
*Attorney, Agent, or Firm*—Townsend and Townsend

[57] ABSTRACT

A system for producing an image by a sequence of intensity values representing pixels of the image which employs means for scanning the image at a non-linear rate and further, includes means modulating the basic illumination and intensity of pixels as a function of scanning speed. The scanner provides a reciprocating scan and in a specific embodiment, a bi-directional scan whereby pixels are projected during both forward and reverse line sweep. The scan pattern is typically sinusoidal but can be any repeatable scan. The rate of output of video data is proportional to the rate of scan as is the average intensity of the output.

22 Claims, 9 Drawing Sheets

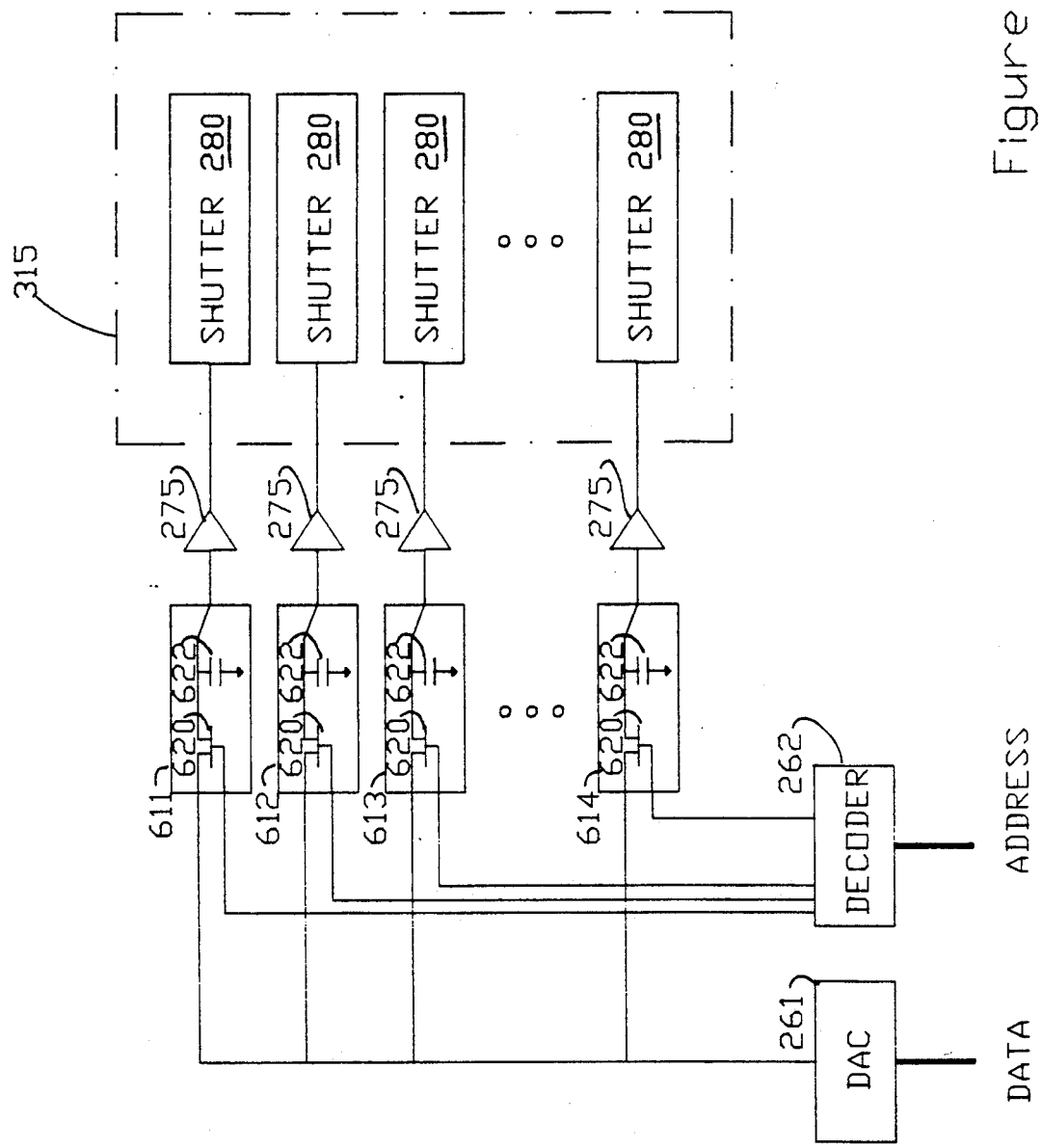

SYSTEM FOR PRODUCING AN IMAGE FROM A SEQUENCE OF PIXELS

BACKGROUND OF THE INVENTION

This invention relates to image display systems in which image elements are projected onto a display surface such as a projection screen, the display surface of a cathode ray tube or, with appropriate precautions, directly onto the retina of the human eye.

Most direct-view video projector display systems are based on cathode ray tube (CRT) technology in which a beam of electrons is directed to impinge on a phosphorescent screen. The resolution and brightness of CRT technology-based displays are inherently limited by the characteristics of phosphors and electron beam control electronics.

Some projection systems have been built using light spot scanning techniques, as distinct from electron beam deflection techniques as used in CRTs. Scanning projection systems typically use two rotating mirrors, one for high speed horizontal scan and one for slower vertical scan. Such a system using two rotating multi-faceted mirrors is described, for example, in U.S. Pat. No. 2,163,548, issued in 1936. A modern variant is described in U.S. Pat. No. 4,097,115. Therein two mirrors are employed in the scanning system. A still further scanning system using rotating multi-faceted mirrors is described in U.S. Pat. No. 4,613,201. The spot scanning systems require expensive and precise high speed scanning mirrors. Typically such systems require mirrors with up to 36 precision faces with rotation speeds of 30,000 revolutions per minute in order to provide a system capable of realtime video projection. Such high-speed rotating mirrors typically require air-bearings or other expensive components. Accordingly, it is desirable to provide a large screen scanning system that eliminates the need for any rotating high speed multi-faceted mirrors or other elements which are particularly sensitive to failure or wear.

Laser illumination has been used in light scanning systems to illuminate a single pixel of image during a high-speed two-dimensional scan of a large projection screen system. A great deal of effort has been expended on achieving the objective using lasers because of their intense light and characteristic coherence. However, the use of lasers in wide spread commercial applications has been difficult to realize and practice for a number of reasons. Some of the difficulties have been discussed in a paper by C. E. Baker of Texas Instruments Inc., *IEEE Spectrum*, December 1968. One particular problem is the generally low efficiency of lasers, which results in unacceptably low picture brightness at large screen sizes for a given power consumption. An increase in laser output has involved an unacceptable increase in cost and complexity for all but the most cost-insensitive applications. Another problem involves the production of suitable red, blue and green light components for color displays. Consequently, systems employing multiple lasers have been required which results in increase in complexity and cost. Finally, a high-speed deflection technique is still required. Solutions offered have been a high-speed rotating multi-faceted scanning mirror, or alternatively, a Bragg cell.

White light sources have been found to be more suitable for color projection than lasers, which require a plurality of lasers to generate the desired colors. However, available light sources have the disadvantage of being less collimated and less coherent than a typical monochromatic laser. Thus, white light sources might be considered less than suitable for spot scanning. A white light source requires relatively large components, including concentration lens, modulator and the like in order to achieve a brightness comparable to that of a laser. Large optical components are unwieldy and expensive. Moreover, large modulators are characterized by speed limitations, making them unsuitable for high-speed scanning systems. Finely-focused bright white light sources are difficult to achieve and hence, resolution is limited. Accordingly, it is desirable to provide a system which neither requires a laser nor the large and expensive optical components which have in the past generally been associated with a white light scanning system. There are several alternatives to scanning-type systems. Among the alternatives are so called "spatial light modulators" (SLMs). One non-scanning color projection technology, referred to as "light valve technology", uses an oil film deformed by electron bombardment. This technology has been incorporated into two known commercially available systems, the Eidophor theatre projection system and the General Electric color television projector, as described in "Color Television Light Valve Projection Systems," *IEEE International Convention, Session* 26/1, 1-8 (1973) and "The Fischer Large-Screen Projection System (Eidophor)," by E. Baumann, 20 *J. SMPTE* 351 (1953). In the Eidophor and G.E. system, a continuous oil film is scanned in raster fashion with an electron beam that is modulated so as to create a spatially-periodic distribution of deposited charge within each resolvable pixel on the flexible film. This charge distribution results in the creation of a phase grating within each pixel by virtue of the electrostatic attraction between the oil film surface and the supporting substrate, which is maintained at constant potential. This attractive force causes the surface of the film to deform by an amount proportional to the quantity of deposited charge. The modulated light valve (incorporating the oil) is illuminated by spatially coherent light from an arc-lamp. Light which is incident to modulated pixels on the oil film is diffracted by the local phase gratings into a discrete set of regularly spaced orders which are made to fall on a Schlieren stop consisting of a periodic array of alternating clear and opaque bars by part of the optical system. The phase perturbations introduced by the modulated electron beam are thus converted into bright spots of light at the screen by the Schlieren projector. A number of non-oil film SLMs have been developed. Among such SLMs are those including deflectable elements, rotation of plane of polarization, and light scattering. Such SLMs employ various effects such as deformation of reflective layers of metal, elastomer, or elastomer-photoconductor, as well as polarization and scattering of ferroelectrics, PLZT ceramics, or liquid crystals. Prior systems have been disclosed by R. Sprague et al., "Linear Total Internal Reflection Spatial Light Modulator for Laser Printing," 299 *Proc. SPIE* 68 (1981) and W. Turner and R. Sprague, "Integrated Total Internal Reflection (TIR) Spatial Light Modulator for Laser Printing," 299 *Proc. SPIE* 76 (1991). Still further, SLMs are disclosed in U.S. Pat. No. 4,710,732. However, none of these technologies has resulted in high resolution, high brightness, video screen projection systems suitable for the consumer marketplace. An experimental video projector has been described by Murano et al. entitled "A Video Projector Using a PLZT Light Shutter Array," *Japanese Journal of Applied Physics*, 24 (1985) *Supplement* 24-2, pp. 139–143. Therein a line PLZT light shutter array was used to modulate light from a Xenon light source. The resulting modulated beam was scanned vertically by a movable mirror and then projected on the screen. However, this system experienced significant problems relating to brightness, uniformity of image, and mirror response time.

What is needed is a system for displaying an image from a sequence of intensity values representing pixels wherein the system is suitable for high volume, low cost production with a reliability acceptable for consumer applications of high resolution video imagery.

SUMMARY OF THE INVENTION

According to the invention, a system is provided for producing an image by means of a sequence of intensity values representing pixels of the image which employs means for scanning the image at a non-linear rate and further includes means modulating the basic illumination and intensity of pixels as a function of scanning rate. Illumination may therefore be spatially biased in accordance with a desired bias function. The scanning means provides a reciprocating scan and in a specific embodiment a bi-directional scan whereby pixels are projected during both forward and reverse line sweep. The scan pattern is typically sinusoidal but can be any repeatable scan. The rate of output of video data is proportional to the rate of scan, as is the average intensity of the output.

The invention will be better understood by reference to the following detailed description in connection with the accompanying drawings.

BRIEF DESCRIPTION OF THE DRAWINGS

FIG. 9 is a block diagram of a shutter control circuit for an optical projection system of the type shown in FIG. 6.

DETAILED DESCRIPTION OF SPECIFIC EMBODIMENTS

Figure 1:
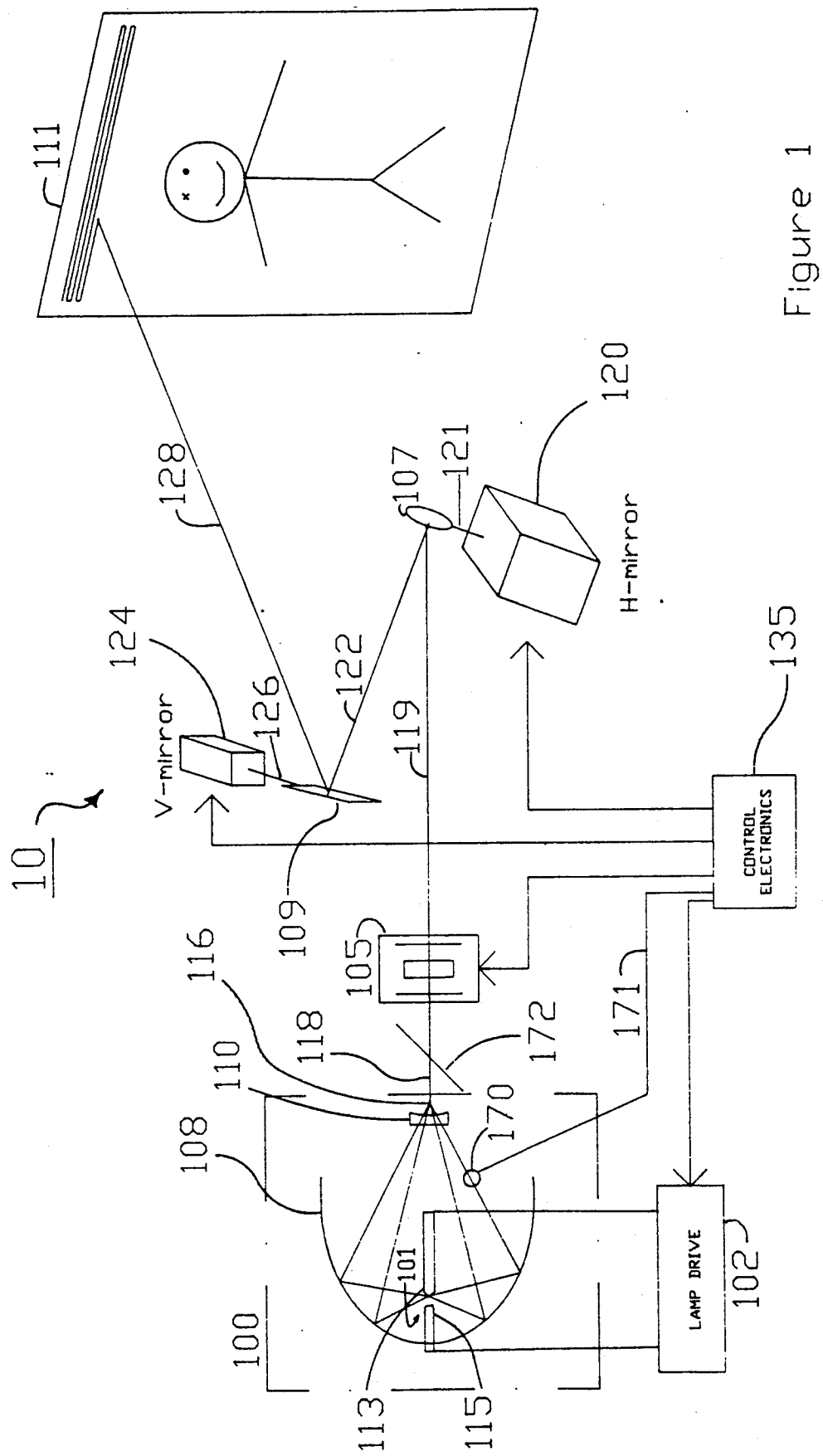
FIG. 1 is a block diagram of the invention incorporating a spot scanner and two scanning mirrors.

Referring now to FIG. 1, there is shown a block diagram of a first specific embodiment of a scanning image display system 10 according to the invention. A light source 100 is coupled to provide a beam through a shutter assembly of 105, which in turn is coupled to a horizontal scanning mirror 107, and thence, to a vertical scanning mirror 109, the output scan of which is directed to impinge upon a screen 111. The light source 100 may comprise a 300 watt xenon short arc lamp 101 driven by a lamp drive 102, an elliptical reflector 108 and a concave collimating lens 110. The arc lamp 101 may produce approximately 5000 lumens of visible light distributed evenly over the visible spectrum. The majority of this light is emitted from the bright spot of approximately 0.5 mm in diameter at the cathode of the arc gap formed by electrodes 113 and 115. The bright spot is positioned at a point extended from the focal point of the elliptical reflector 108 to direct light to a focusing point 116 behind the concave lens 110. The concave lens 110 collimates the received convergent light into a beam 118 which in turn is directed through a shutter 105, as hereinafter explained.

Suitable alternative lights include small lamps such as mercury and halide arc-lamps. The lamp drive 102 is selected accordingly. Power for the light source 100 can be modulated under control of control electronics 135 as hereinafter explained. A photodetector 170 may be used to monitor light level and feedback a signal via line 171 to control electronics 135. The control electronics 135 controls the drive voltage supplied to the lamp drive 102 to control luminosity output. The drive voltage could be controlled as a function of time without feedback to compensate for predicted aging characteristics of the arc lamp or predicted luminosity characteristics based on the scanning characteristic of the apparatus.

A reflector 172 is disposed in the path of beam 118 at an angle to reflect undesired infrared radiation and the associated heat. The reflector 172 is coated to pass light energy into reflective infrared energy. The control electronics 135 are coupled to the shutter 105 to control the transmissivity of the shutter 105. The shutter 105 may comprise a digital-to-analog converter coupled to a voltage controlled light modulator. A suitable light modulator is a PLZT modulator, for example, as discussed in "Improved Hot-Pressed Electro-Optic Ceramics in the (Bb, La) (Zr, Ti) $O_3$ System," by G. H. Haertling, *Journal of the American Ceramics Society*, June 1971, Vol. 54, No. 6, p. 303. An alternative to the PLZT modulator is a Pockels' cell or other optic modulator.

The output from the light shutter 105 is in the form of a modulated beam 119 directed to mirror 107 mounted to horizontal mirror drive 120. Horizontal mirror drive 120 resonates harmonically at about half the required horizontal line synchronization. However, unlike conventional NTSC scanning, which is uni-directional, horizontal mirror drive 120 is constructed to scan bidirectionally, left and right, in accordance with the invention, and further in accordance with the invention, with a scan characteristic which is sinusoidal.

Bidirectional scanning has a particular advantage that brighter screen image can be provided since there is a longer duty cycle than a unidirectional scanning, which must be blanked during fly-back. Bidirectional scanning is accomplished by driving the mirror drive 120 with a resonant circuit in the control electronics 135 and by controlling the modulation of the light shutter 105 by buffering video data in a memory unit to read out data in correspondence with the scan position of the mirror. Further, the intensity of the modulated light beam 119 is further compensated in accordance with the instantaneous rate of the scan. In a preferred embodiment, the horizontal mirror driver 120 oscillates a drive shaft 121 sinusoidally over approximately 10 degrees of radial displacement at a frequency of 8 kHz. The scanning mirror 107 is flat such that the location of the surface of the mirror 107 relative to the center of axis of the drive shaft 121 is not critical.

The mirror 107 may be any form of optical redirector, such as a reflector (mirror), a refractor (prism), or a defractor (grating) under appropriate circumstances.

The redirected beam 122 off of the mirror 107 is directed to impinge upon a vertical mirror 109, which has sufficient length along an axis of rotation to intercept the redirected beam 122 across its full sweep. The vertical mirror 109 is under control of vertical mirror drive 124, which in turn is controlled by control electronics 135. The vertical mirror drive 124 scans at a relatively slow rate of speed such as about 60 Hz corresponding to the standard NTSC vertical sweep rate. The vertical mirror drive 124 drives a vertical mirror axis 126 which is coupled to the vertical mirror 109. The vertical mirror axis 126 is rotated for example according to a sawtooth characteristic at the vertical sweep frequency allowing time for fly-back during a vertical blanking of pulse, according to conventional video design. Alternatively, the vertical mirror 124 may be rotated according to a nonlinear quasi-triangular characteristic. An output scan beam 128 is directed to screen 111 to produce a desired image from the pixel information extracted from control electronics 135.

Not shown, but within the contemplation of the present invention, is a color image scanning system wherein three beams of separate colors are combined into a single modulated beam 119 and directed along a common light path to the horizontal mirror 107.

It is preferable that the natural mode of resonance of horizontal mirror 107 and mirror shaft 121 is the same as the drive frequency of the horizontal mirror drive 120. If a mutually resonant scan frequency is provided, the power consumption of the system is minimized. Return springs may be used to change the resonance characteristics of the mirror.

Figure 2:
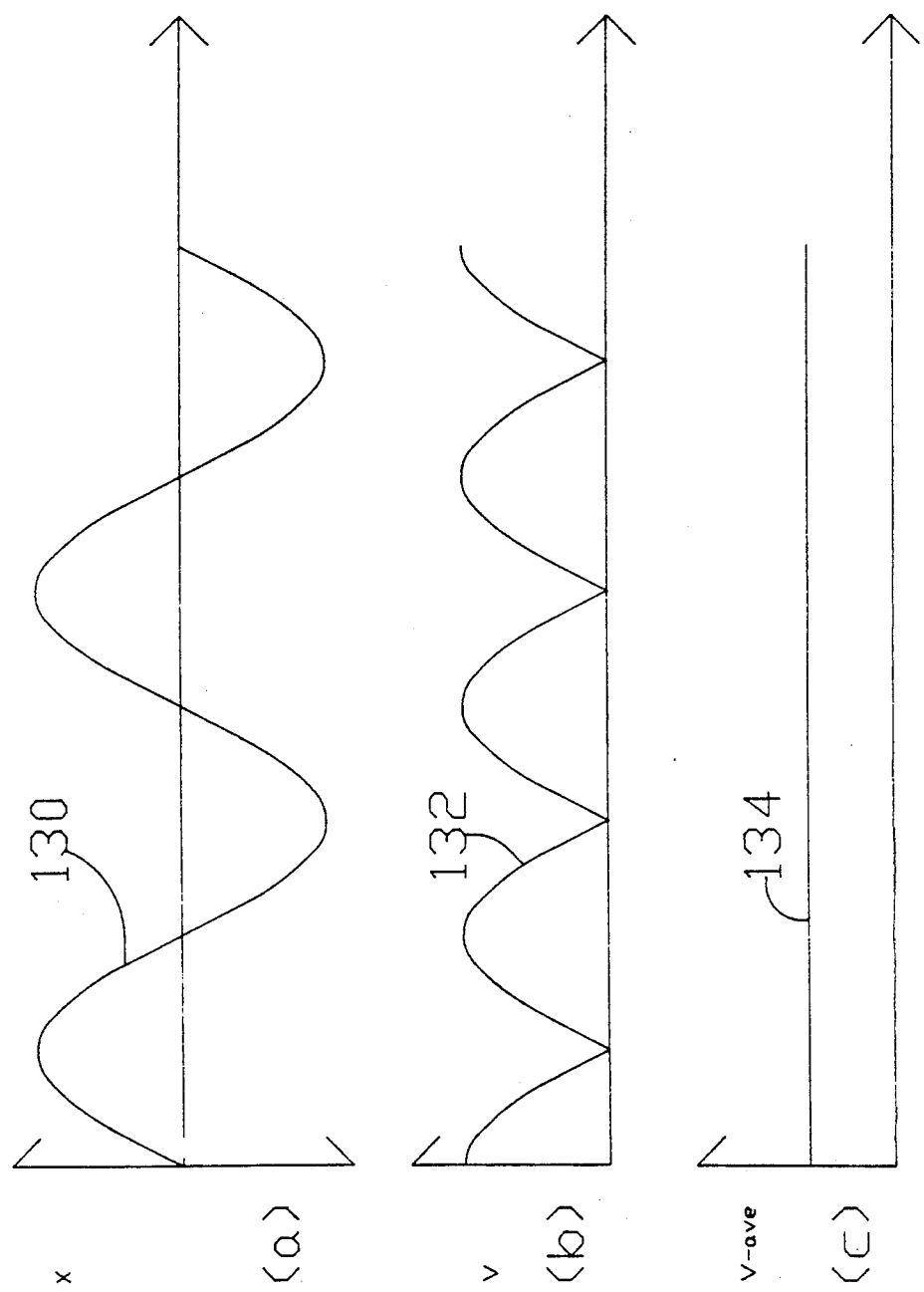
FIG. 2 is a waveform diagram illustrating a sinusoidal mirror drive waveform with corresponding instantaneous velocity and average velocity waveforms.

Referring to FIG. 2, there is shown in Part a, a representative sinusoidal function 130 illustrating sweep speed (x axis) versus time (y axis). In Part b, there is shown a characteristic curve for intensity (130) corresponding to the desired compensation amplitude. The desired compensation amplitude characteristic 132 may be, for example, stored in a random access memory table used to compensate for the amplitude effect of the changing scan rate of a sinusoidal scan. The table of values resembles an absolute cosine function. The correction multiplies the light value by an instantaneous scan velocity. If a constant scan rate were to be used, no correction would be required, as illustrated by the zero correction characteristic 152 of Part c in FIG. 3.

Figure 3:
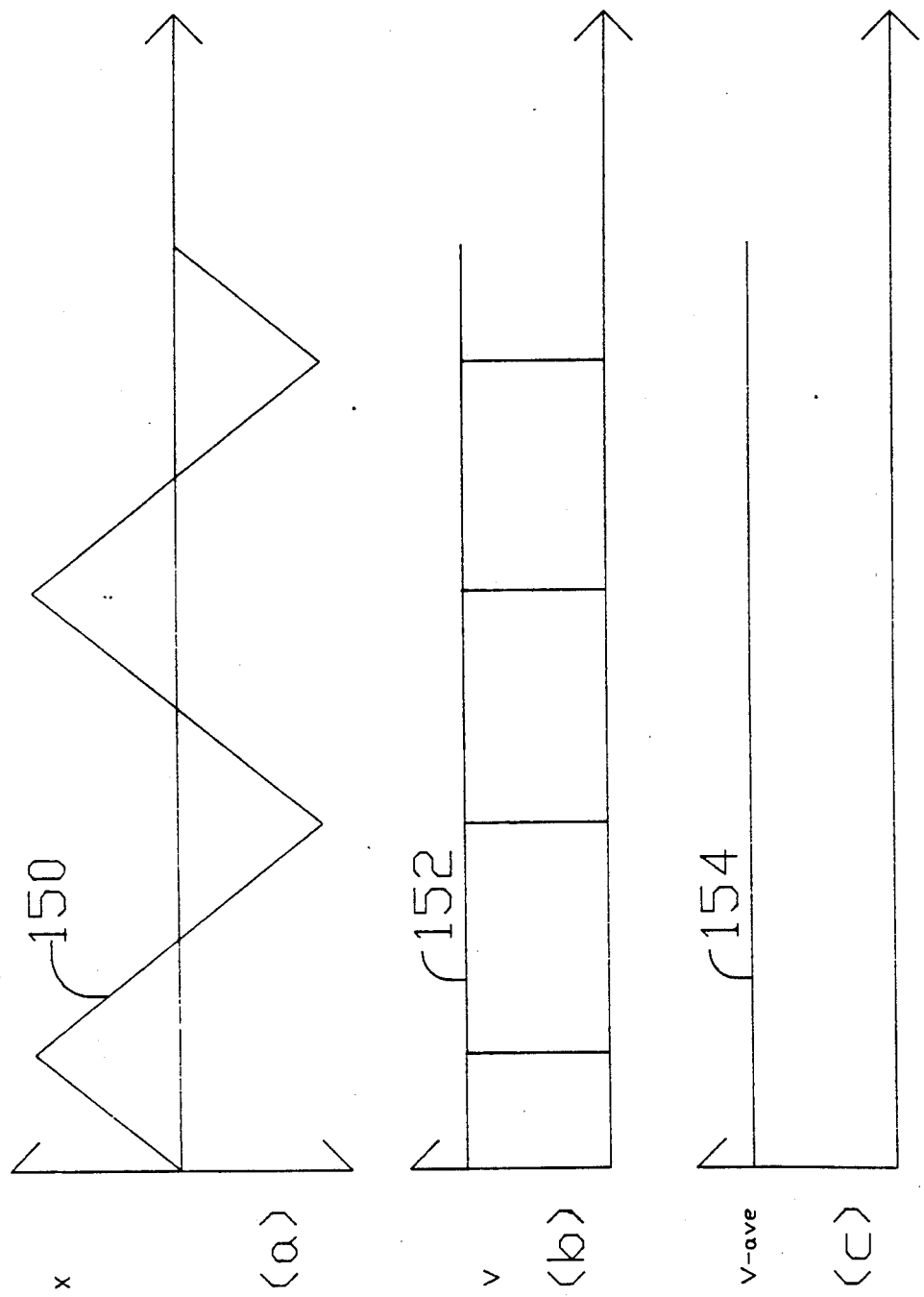
FIG. 3 is a waveform diagram showing a triangular mirror drive waveform with corresponding instantaneous velocity and average velocity waveforms.
Figure 4:
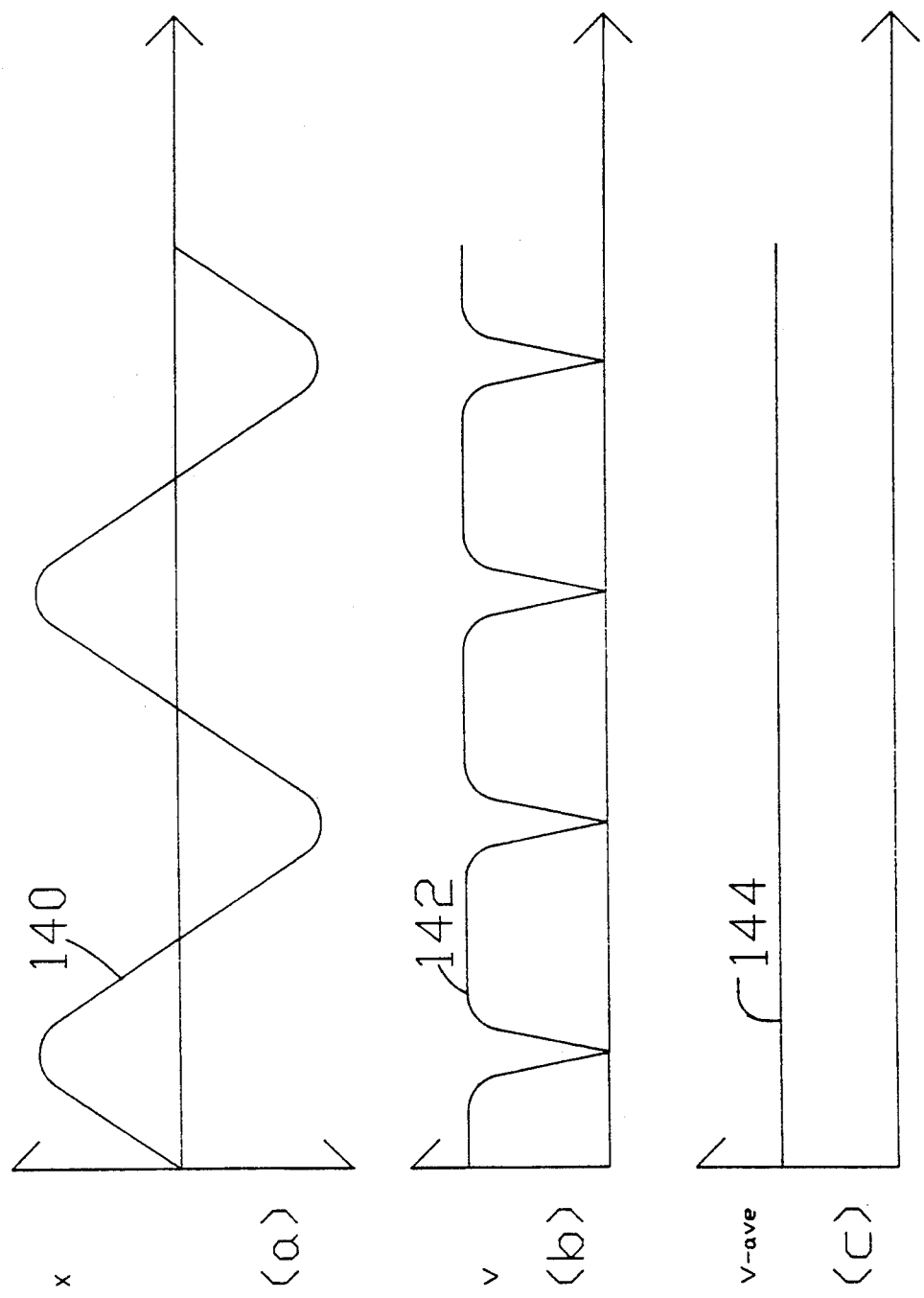
FIG. 4 is a waveform diagram for a mirror drive having a flattened triangular characteristic with corresponding instantaneous velocity and average velocity waveforms.

It is not required that the horizontal mirror drive 120 operate according to a sinusoidal characteristic. For example, referring to FIG. 4, a drive characteristic 140 may, for example, be a damped triangular characteristic. Accordingly, the compensation characteristic 142 comprises a nearly constant level compensated by intensity changes at the peaks of the scan characteristic, for example, at points A, B, C, D, designating a minima. The average light level is represented by the characteristic 144, which is slightly higher than the average of the sinusoidal characteristic 134 (FIG. 2). By contrast, there is shown in FIG. 3 an idealized triangular sweep characteristic 150 with nearly linear compensation characteristic 152 and a high average intensity level 154. The compensation characteristic would ideally be zero at the singularities of transition of the triangular characteristic 150. The triangular characteristic 150 is ideal but impractical because of physical limitations due to mechanical inertia. Only under those circumstances would no compensation or correction be required, since a constant scan rate could be achieved.

Unfortunately, a sinusoidal waveform for a mirror drive which has certain mechanical advantages, is not ideal optically. The maximum light value achievable at a screen position wherein the mirror scans at its maximum rate is only one half of the light value achievable at a screen position where the scan rate is one half its maximum rate. Thus, in order to achieve uniform brightness across the screen, each light value must be reduced by the ratio of its scan rate to the maximum scan rate obtained during a complete cycle. The ideal optical scan would thus be a constant scan rate, such as achieved by a triangular drive waveform, as shown in FIG. 3. This triangular drive waveform has been previously discussed mechanical disadvantages. A compromise is the alternative of the damped triangular waveform of FIG. 4. As will be noted, the damped triangular waveform of FIG. 4 has a higher average velocity than the sinusoidal waveform, which increases the overall image brightness, and the near sinusoidal accelerations have the mechanical advantages attributed to a sinusoidal scan. Thus, a damped triangular waveform has both the optical advantages of the triangular scan and the mechanical advantages of the sinusoidal scan. Accordingly, a purpose of the invention is to obtain a true image using nonideal scanning means.

A PLZT modulator does not respond linearly to voltage control. Therefore, amplitude of the output video requires further direction to compensate for response. Compensation may be experimentally derived, or it may be determined by active feedback. If experimentally derived, position as well as intensity may be compensated for by an open loop compensation technique. Pixel by pixel intensity compensation values may be stored in random access memory in the control electronics 135 and thus be used to weight the transmissivity of the PLZT shutter 105.

Figure 5:
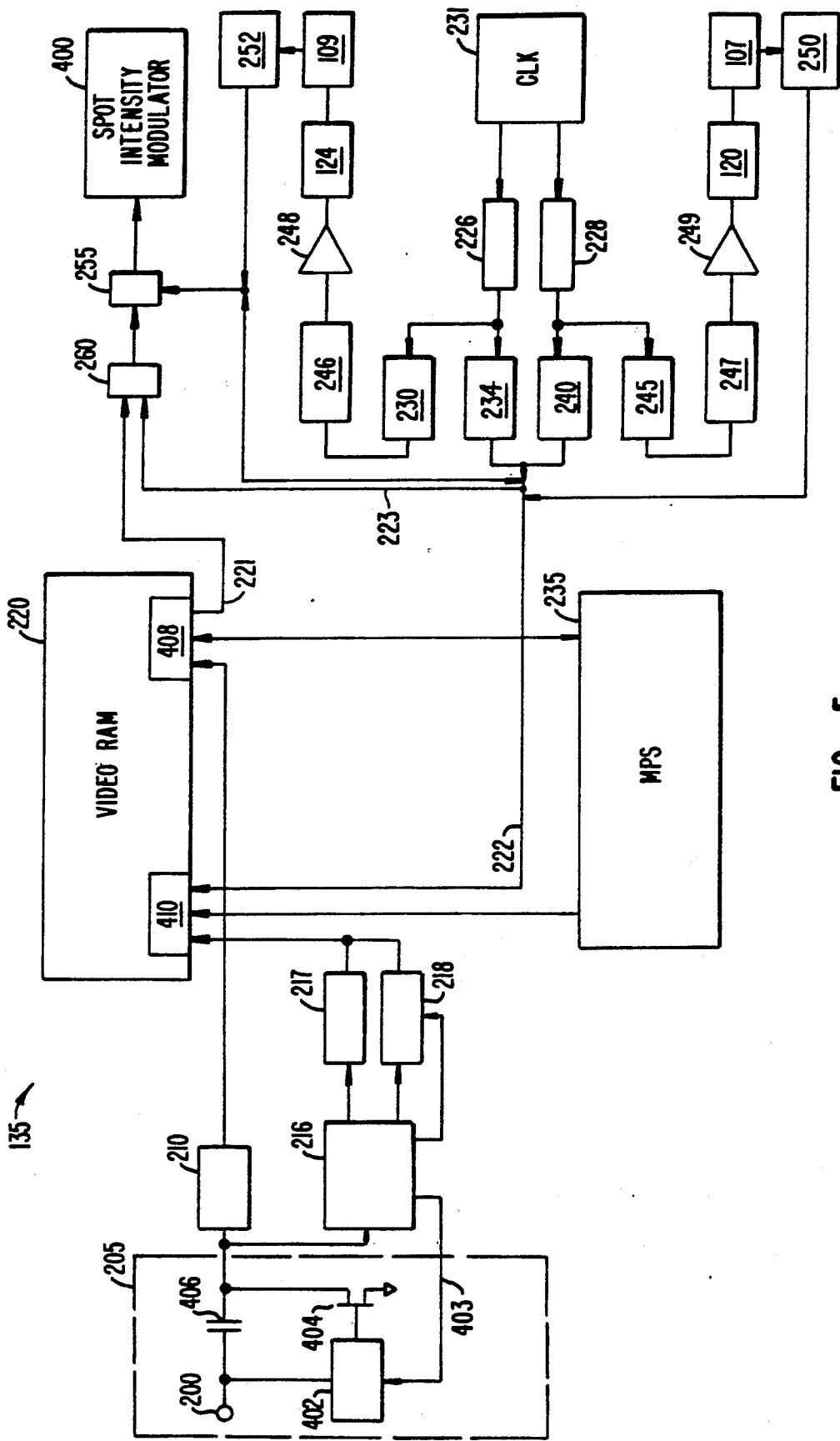
FIG. 5 is a block diagram of a first embodiment of control electronics in accordance with the invention.

FIG. 5 is a block diagram of the control electronics 135 of the system 10 of FIG. 1. The control electronics 135 herein describe an electro-mechanical system. The control electronics 135 may be adapted to purely electronic output control by appropriate modification to or substitution for electromechanical components. The control electronics 135 receives a conventional video input signal, such as an NTSC signal, at signal terminal 200 and produces as output three control signals, a first mirror control signal at the output of first mirror drive 124, a second mirror control signal at the output of second mirror drive 120, and a spot intensity modulation signal to a spot intensity modulator 400, as hereinafter explained. At the input of an NTSC type of controller, a black level restore circuit 205, comprising a signal conditioner 402, an FET 404 and a capacitor 406, may be provided. Its function is to normalize the black level of the video signal. The output of the black level restore circuit 205 is coupled both to a flash analog to digital converter 210 and to a synchronization separator 216. The synch separator 216 may be based on a National Semiconductor LM1881 device and is operative, in additional to generating input to H-sync 217 and to V-sync 218, to identify the black level portion of the video signal (referred to as the "porch") and to cause the signal conditioner 402, through a feedback line 403, to turn on FET 404, connecting signal to ground, thereby normalizing the dc level of the video signal.

A video RAM frame bank 220 configured as a dual ported Random Access Memory is provided for storing and simultaneously retrieving a relevant portion of the video image, depending on the mode of operation and type of control used. The video RAM frame bank 220 may for example store a portion of a video image, a complete frame of a video image, or multiple frames of a video image. The flash analog to digital converter 210 is coupled to the data input of the bank 220 through a first data multiplexer 408. The purpose and function of the converter 210 is to capture a stream of samples of the analog input video signal and direct a digital representation into the RAM bank 220. The address of the data is specified by a horizontal position counter 217 and a vertical position counter 218 driven by the synch separator 216. The vertical position counter 218 is set to be capable of distinguishing between odd numbered video lines and even numbered video lines, which is particularly useful for storage of an interlaced display image, such as NTSC. The counter inputs to the bank 220 are also multiplexed, for example, through a second data multiplexer 410.

Horizontal and vertical positioning of the mirror drives 120 and 124 are controlled by a clock 231 under control of an input timing signal and which drives a vertical counter 226 and a horizontal counter 228, each of which in turn drives a first table RAM 230 and a second table RAM 245. According to the invention, the first and second table RAMs 230 and 245 provide a table-based translation or remapping of a sequential vertical count and a sequential horizontal count into a vertical position value and a horizontal position value for the respective horizontal mirror drive 120 and vertical mirror drive 124 according to a desired nonlinear sweep characteristic. The output of the first table RAM 230 in response to the input address value from the counter 226 is data used to specify a vertical position. The value at that address has been preselected according to the desired nonlinear positioning characteristic for the vertical mirror drive 124. The output of the second table RAM 245 in response to the input address value from the counter 228 is data used to specify a horizontal position. The value at that address has been preselected according to the desired nonlinear positioning characteristic for the horizontal mirror drive 120.

In the specific embodiment shown in FIG. 5, the vertical position value is converted from a digital magnitude to an analog magnitude to drive the vertical mirror drive 124 by means of a first digital to analog converter 246 coupled through an amplifier 248. The horizontal position value is converted from a digital magnitude to an analog magnitude to drive the horizontal mirror drive 120 by means of a second digital to analog converter 247 coupled through an amplifier 249. The output of the first or vertical mirror drive 124 is an angular displacement about vertical mirror axis 126 for the vertical mirror 109. The output of the second or horizontal mirror drive 120 is an angular displacement about horizontal mirror axis 121 for the horizontal mirror 107.

Alternative drive schemes are within the contemplation of the invention. Direct digital positioning signals may be employed. Drive signals may be provided for beam steering mechanisms other than electromechanical systems to position or direct the scanning beam.

The mirrors 107 and 109 are preferably oscillated at a resonant mechanical frequency such that energy consumption is minimized. Oscillation need not be resonant so long as the position of the mirrors is predictable. In one embodiment, for example as shown in FIG. 5, feedback circuits 250 and 252 may be employed to sense true mirror position as a function of time, or alternatively true mirror velocity or true mirror acceleration, and provide such information to amplitude compensators 255 and 260.

The counters 226 and 228 provide the horizontal and vertical position counts for reading the information out of the RAM bank 220 as well as for spot positioning. In a specific embodiment, the horizontal counter 226 toggles at a rate 512 times faster than the vertical counter 228 to provide a horizontal pixel resolution of 512 points.

A vertical address table 234 and a horizontal address table 240 respond to the respective counters 226 and 228 to synchronize the addressing of data from RAM bank 220 to the current position of the projection scan point. The address on RAM address bus 222 corresponds to the position in the video buffer corresponding to the currently addressed pixel position. Both horizontal and vertical address information are carried via address bus 222.

The amplitude compensator 255 comprises a RAM table used to compensate for the amplitude effects of the changing scan rate of the custom nonlinear scan according to the invention. Scan rate is greater at the center of the screen, which causes the appearance of spatially long, dim pixels in a duration-sensitive pixel display environment, and which is slower at the edge of the screen, which causes the appearance of spatially short bright pixels. The amplitude compensator 255 provides compensated intensity data at its output in response to receipt of the horizontal and vertical position data from the address tables 234 and 240 and pixel intensity data (or a compensated version thereof, as represented by precompensator 260 coupled to receive an error signal on error signal line 223) from the RAM bank 220 via RAM data line 221. These two inputs are used to address a table of values in a spot intensity modulator corresponding to one of the nonlinear functions of FIGS. 2, 3 or 4. This address information directly or indirectly modulates the spot intensity at the screen. The input to the precompensator 260 is the pixel information from the frame bank 220. The output is digital information representing the desired spot modulator intensity. The output of the amplitude compensator 255 is a digital word representing a desired voltage directly but nonlinearly proportional to the transmissivity of the iris of the modulator/shutter.

Controller housekeeping is provided by means of a microprocessor system 235. The microprocessor system 235 is coupled to address the video RAM bank 220 and to monitor the content. Means may be provided through the microprocessor to communicate to and monitor the status of the system.

Figure 6:
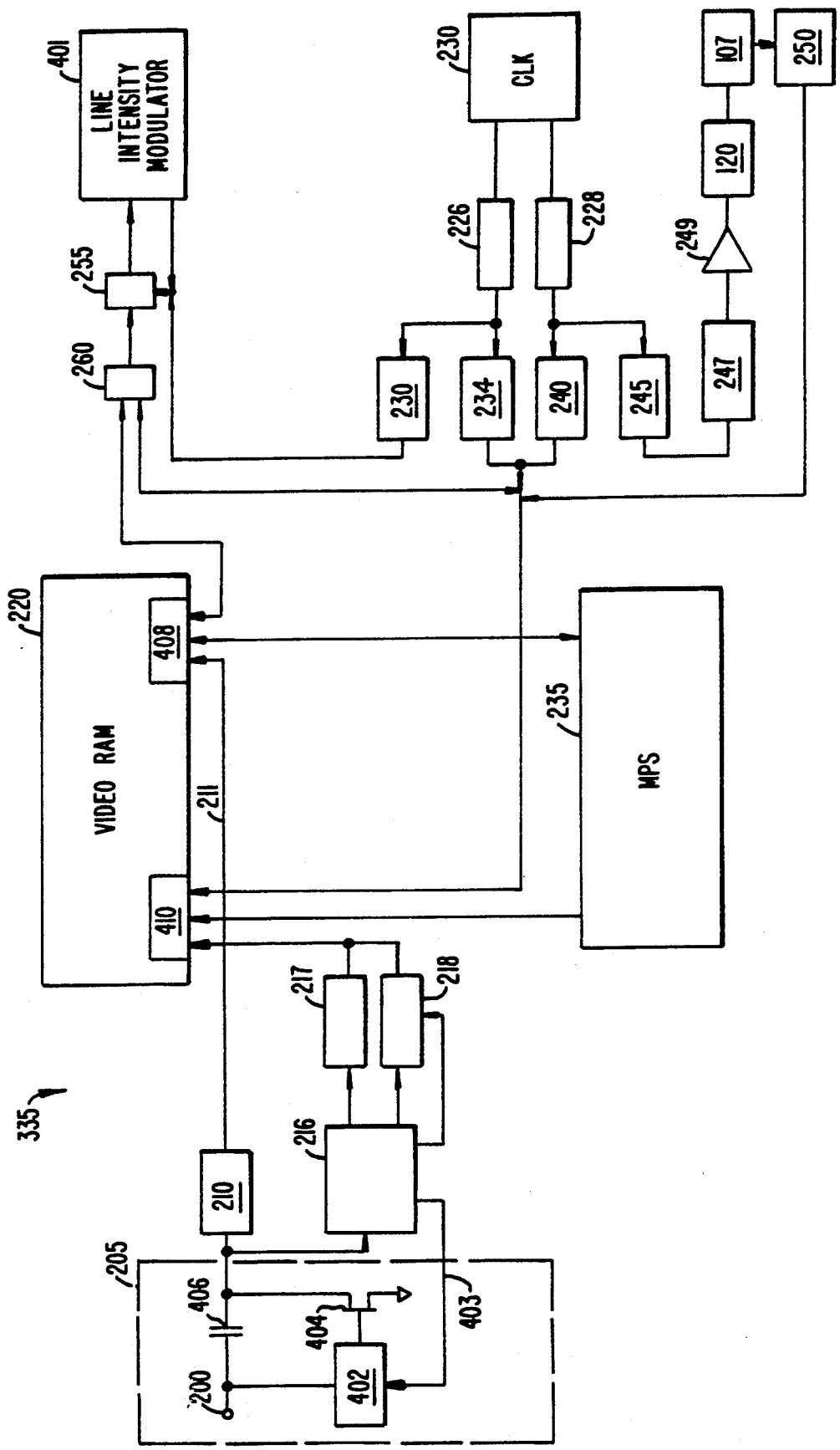
FIG. 6 is a block diagram of a second embodiment of control electronics according to the invention.
Figure 7:
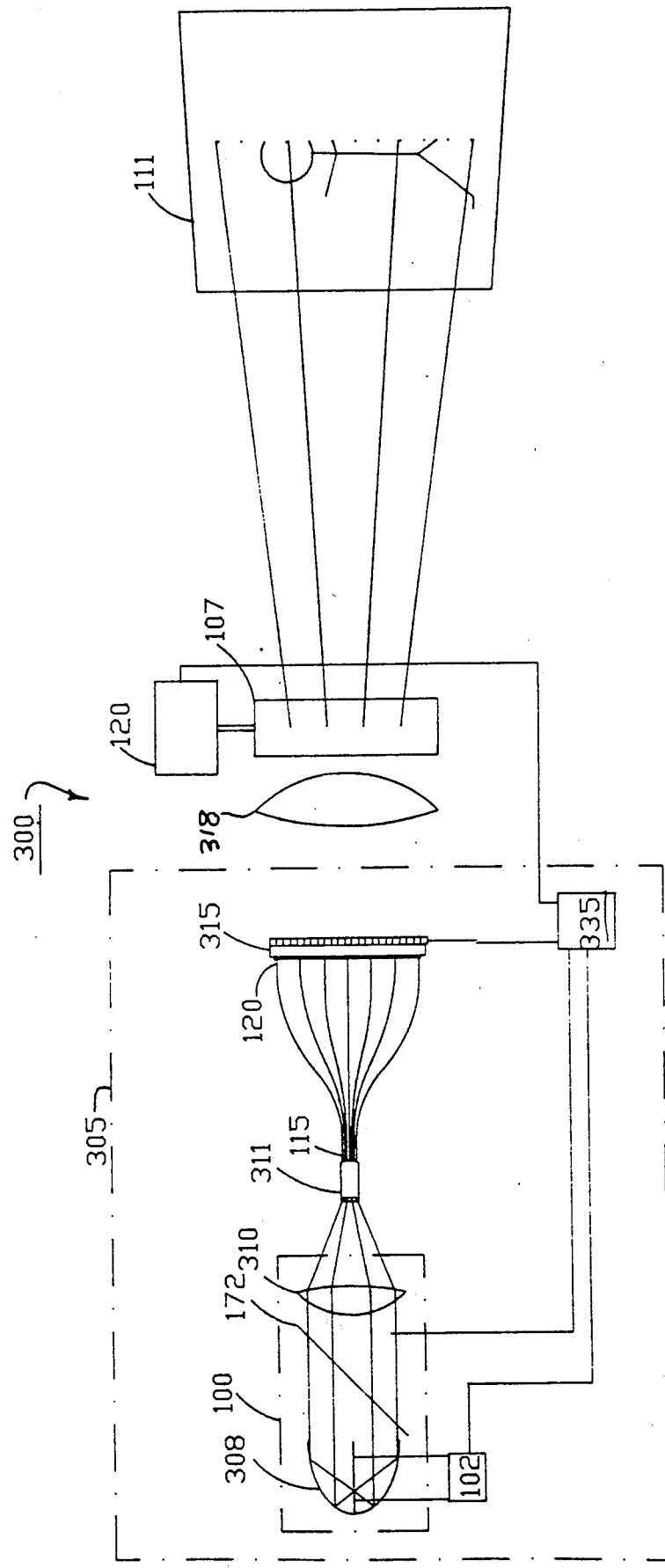
FIG. 7 is a pictorial block diagram of a second embodiment of an optical projection system in accordance with the invention.

FIG. 6 is an alternative embodiment of the control electronics 135 according to the invention. FIG. 7 is an alternative embodiment of the system 300 according to the invention. The control electronics 135 of FIG. 6 in connection with the system 300 of FIG. 7 corresponds to the embodiment of FIG. 5 as indicated by common enumeration, except that the embodiment of FIGS. 6 and 7 has been adapted for use with a line light source 305 as in FIG. 7. Control electronics 335 provides only single-mirror electro-mechanical control. Address decode table 230 maps the vertical count from the vertical counter 226 into the address of the amplitude compensator 255 and to the line intensity modulator 401 of the line source 305. In this embodiment, however, the address value input is used for secondary effect compensation, as the address value input is used only for biasing the transmissivity of the individual shutters of the line light source. The operation of the line intensity modulator 401 is explained with respect to FIG. 9. In this embodiment, the vertical addresses are changed at a rate sufficient to actuate all cells of the line intensity modulator in order to provide current data to each horizontal position of a line.

In the embodiment of FIG. 7, a parabolic mirror 308 is employed to collimate the output energy of a point light source 100 at the focus of the mirror. A convex lens 310 captures and concentrates the output energy on a target comprising the flat tip of a clad fiber optic rod 311. The rod 311 is characterized by parallel outer walls having total internal reflection. The rod 311 may have a round or preferably hexagonal cross-section. The rod 311 abuts a first tip of a fiber optic bundle 115. The bundle 115 is unfolded and spread into a flat line of fibers at a second tip 120 no more than a few fibers thick. The light outputs of the second tip 120 at the opposing end are directed to illuminate a line light shutter 315. The line light shutter 315 is for example a line array of PLZT modulators operative under control of the control electronics 335 of the embodiment of FIG. 6. The output of the line light shutter 315 is directed through a projection lens 318 and a scanning mirror 107 to a screen 111 such that scanning according to the requirements of images on the screen 111 produces an desired image.

Figure 8:
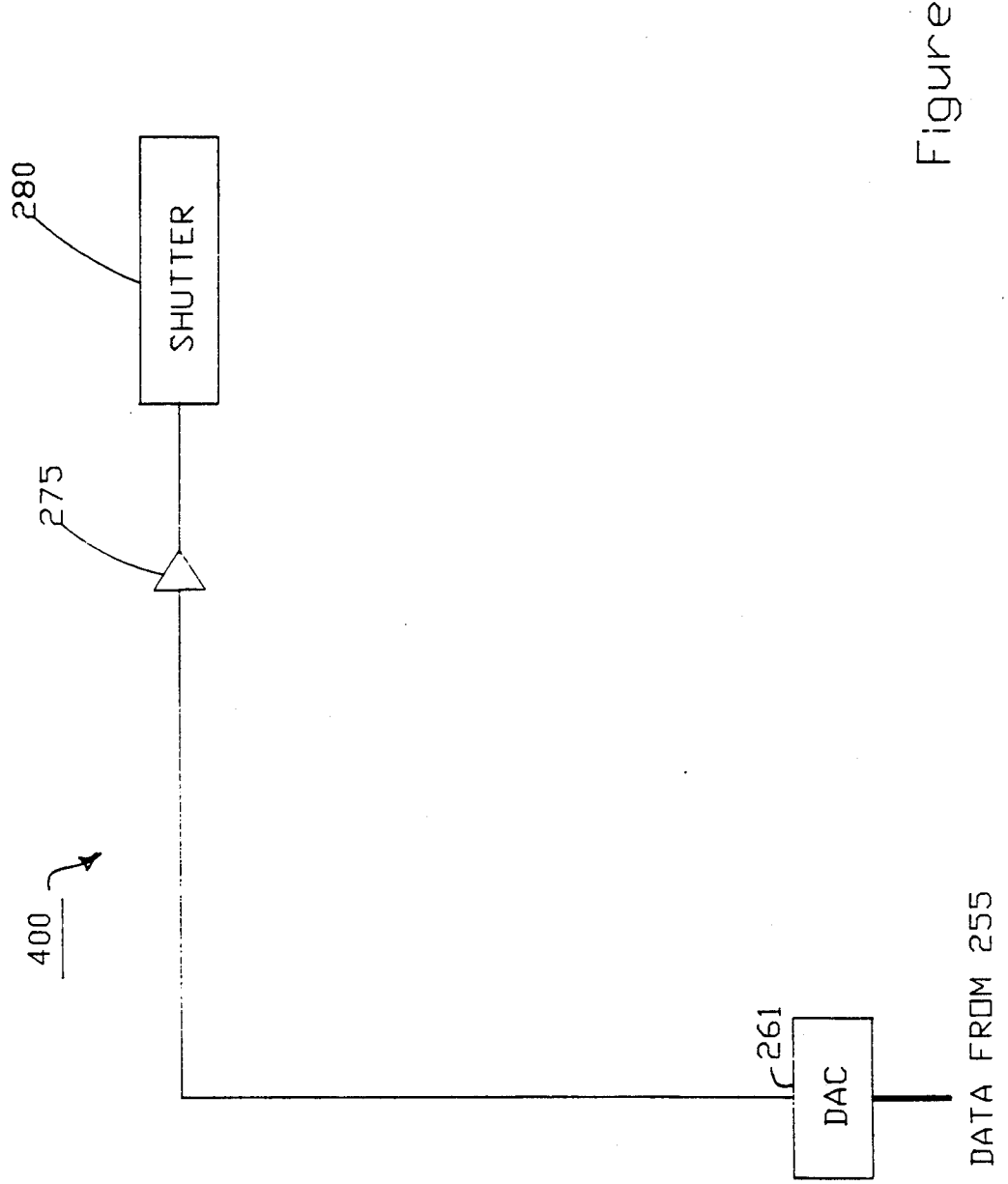
FIG. 8 is a block diagram of a shutter control circuit for an optical projection system of the type shown in FIG. 5.

A spot intensity modulator 400 comprising a single shutter is illustrated in FIG. 8. A digital to analog converter (DAC) 261 receives digital data from the compensator 255 (of FIG. 5) and couples an analog signal to an amplifier 275, the output of which is a drive voltage to a shutter or light valve 280. The shutter 280, which may be a PLZT element or other high-speed valve, modulates incident light, which in turn is directed to the spot steering system comprising the moving mirrors of FIG. 1.

A line intensity modulator 401 comprising a plurality of shutters is illustrated in FIG. 9. A DAC 261 receives digital data from a compensator 255 (of FIG. 6) and couples an identical analog signal to the inputs of a bank of sample and hold elements, for example 611-614 of a monolithic semiconductor circuit. The sample and hold elements 611-614 each comprise an FET switch 620 and a storage capacitor 622. There may be N=2000 sample and hold elements in a single high definition line display system. An address-to-N-line decoder 262 is coupled to each of the gate control inputs of the FET switches 620 to control the serial sampling of the analog signal line out of the DAC 261. The rate of change of the address is the sweep frequency of line intensity modulator 401. The sampled value is stored in the N individual capacitors 622 and drives corresponding N amplifiers 275. The N amplifiers 275 provide drive voltage for corresponding N shutters 280. Together the N shutters 280 comprise the line shutter 315 of FIG. 7.

The invention has now been described with reference to specific embodiments. Other embodiments will be apparent to those of ordinary skill in the art upon reference to this description. For example, although the illustrated embodiment shows the invention used in combination with a video signal, such as might be provided by a television receiver, the invention is suitable for the projection of any image by either synchronizing an image signal with a projection system or by storing a digitized representation of an image in a video buffer. Other light sources are also contemplated, such as a low-cost reliable CW laser, other point light sources with mirrors and lenses or the like. Still further, as an alternative to a moving scanning mirror, a moving refractor (prism), defractor (grating) or other electromagnetic or electrooptic defection means could be used to deflect a scan. Still further, the entire image need not be buffered at any one time so long as the image buffer is large enough to accommodate the differing rates of input and output data streams. A buffer of appropriate size could be used in the event a linear vertical mirror is used or only unidirectional scans are invoked. Still further, a number of the advantages of the specific embodiments disclosed herein could be incorporated to advantage in a variety of scanning systems including cathode ray tube scanning systems and printer scanning systems. This invention is readily adapted and applied to displaying information from a first format in a second format which is time-base incompatible with the first format. Real-time image data buffering according to the invention enables the receiving display technology to control the nature of the display. Therefore, it is not intended that this invention be limited, except as indicated by the appended claims.

We claim:

1. A system for producing an image from a sequence of intensity values representing pixels of said image, said system comprising:

means coupled to receive said sequence of intensity values for displaying said pixels, said displaying means being operative to mechanically project said pixels bidirectionally in a scan, said sequence of intensity values being synchronized with said displaying means to produce individual values of said sequence of intensity values corresponding to position of said pixels in said image;

means coupled to said displaying means for determining said pixel position; and means coupled to said pixel position determining means for modulating amplitude of said pixels as displayed in response to said individual values.

2. A system for producing an image from a sequence of intensity values representing pixels of said image, said system comprising:

means coupled to receive said sequence of intensity values for displaying said pixels, said displaying means being operative to mechanically project said pixels in a scan, said sequence of intensity values being synchronized with said displaying means to produce individual values of said sequence of intensity values in correspondence with position of said pixel in said image;

means coupled to said displaying means for determining pixel position; and means coupled to said pixel position determining means for modulating amplitude of said pixels as displayed in response to said intensity values.

3. A system for producing an image from a sequence of intensity values representing pixels of said image, said system comprising:

means coupled to receive said sequence of intensity values for displaying said pixels, said displaying means being operative to mechanically project a scan of said pixels reciprocatively at a non-linear rate, said sequence of intensity values being synchronized with said displaying means to produce individual values of said sequence of intensity values in correspondence with position of said pixels in said image;

means coupled to said displaying means for determining said pixel position; and means coupled to said pixel position determining means for modulating amplitude of said pixels as displayed in response to said intensity values.

4. The system according to claim 1, 2 or 3 wherein said intensity modulating means further comprises means for modulating intensity as a function of scan rate such that pixels as displayed are illuminated according to a desired bias.

5. The system according to claim 1, 2 or 3 wherein said pixel position determining means further comprises:

means for predicting said pixel position of said displaying means; and means coupled to said displaying means for synchronizing said sequence of intensity values to said displaying means in response to said predicted position.

6. The system according to claim 1, 2 or 3 wherein said pixel position determining means further comprises:

means for detecting pixel position of said displaying means; and means coupled to said displaying means for synchronizing said sequence of intensity values to said displaying means in response to said detected position.

7. The system according to claim 1 or 2, wherein said displaying means is operative to scan at a substantially linear scan rate.

8. The system according to claim 1 or 2, wherein said displaying means is operative to scan at a non-linear scan rate.

9. The system according to claim 8 wherein said intensity modulating means further comprises means for modulating intensity in proportion to said non-linear scan rate such that said pixels as displayed are uniformly illuminated.

10. The system according to claim 9 wherein said scan position determining means further comprises:

means for predicting pixel position of said displaying means; and means coupled to said displaying means for synchronizing said sequence of intensity values to said displaying means in response to said predicted position.

11. The system according to claim 9 wherein said scan position determining means further comprises:

means for detecting position of said displaying means; and means coupled to said displaying means for synchronizing said sequence of intensity values to said displaying means in response to said detected position.

12. The system according to claim 7 wherein said intensity modulating means further comprises means for modulating intensity in proportion to said linear scan rate such that said pixels as displayed are uniformly illuminated.

13. The system according to claim 12 wherein said scan position determining means further comprises:

means for predicting pixel position of said displaying means; and means coupled to said displaying means for synchronizing said sequence of intensity values to said displaying means in response to said predicted position.

14. The system according to claim 12 wherein said scan position determining means further comprises:

means for detecting pixel position of said displaying means; and means coupled to said displaying means for synchronizing said sequence of intensity values to said displaying means in response to said detected position.

15. The system according to claim 1, 2 or 3 further comprises memory means for storing said intensity values representing said pixels and addressing means for addressing said stored intensity values representing said pixels.

16. The system according to claim 1, 2 or 3 wherein said image has a fixed axis of resolution and a bandwidth-limited axis of resolution, said displaying means further comprises means for projecting sequences of intensity values simultaneously along said fixed axis of resolution while projecting said intensity values representing said pixels sequentially along said bandwidth-limited axis of resolution.

17. The system according to claim 2 or 3, wherein said displaying means is operative to project said scan of said pixels unidirectionally.

18. A system for producing an image from a sequence of intensity values representing pixels of said image, said system comprising:

means coupled to receive said sequence of intensity values for displaying said pixels; and means coupled to said displaying means for projecting said pixels bidirectionally in a scan.

19. A system for producing an image from a sequence of intensity values representing pixels of said image, said system comprising:

means coupled to receive said sequence of intensity values for displaying said pixels; and means coupled to said displaying means for mechanically projecting a scan of said pixels reciprocatively at a non-linear rate.

20. A method for producing an image from a sequence of intensity values representing pixels of said image, said method comprising the steps of:

mechanically projecting a sequence of said pixels in a scan, said sequence of said pixels having values synchronized to produce intensity corresponding to position of said pixels in said image;

determining said pixel position; and modulating amplitude of said pixels as displayed in response to said intensity values.

21. A method for producing an image from a sequence of intensity values representing pixels of said image, said method comprising the steps of:

mechanically projecting a sequence of said pixels bidirectionally in a scan, said sequence of said pixels having values synchronized to produce intensity corresponding to position of said pixels in said image;

determining said pixel position; and modulating amplitude of said pixels as displayed in response to said intensity values.

22. A method for producing an image from a sequence of intensity values representing pixels of said image, said method comprising the steps of:

mechanically projecting a sequence of said pixels reciprocatively at a non-linear rate in a scan, said sequence of said pixels having values synchronized to produce intensity corresponding to position of said pixels in said image;

determining said pixel position; and modulating amplitude of said pixels as displayed in response to said intensity values.

* * * * *